(12) United States Patent
Ju

(10) Patent No.: US 6,225,629 B1
(45) Date of Patent: May 1, 2001

(54) BOLOMETER WITH A SERPENTINE STRESS BALANCING MEMBER

(75) Inventor: Sang-Baek Ju, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/146,255

(22) Filed: Sep. 3, 1998

(51) Int. Cl.$^7$ .................................................. H01L 31/09
(52) U.S. Cl. ........................ 250/338.1; 250/332; 338/18
(58) Field of Search ................................ 250/332, 338.1, 250/338.4, 342; 338/15, 18, 17, 22 R; 438/50; 257/417, 669

(56) References Cited

U.S. PATENT DOCUMENTS

| | | | |
|---|---|---|---|
| 3,931,573 | * 1/1976 | Hopfer | 324/106 |
| 4,922,116 | * 5/1990 | Grinberg et al. | 250/495.1 |
| 5,010,251 | * 4/1991 | Grinberg et al. | 250/332 |
| 5,021,663 | * 6/1991 | Hornbeck | 250/349 |
| 5,264,375 | * 11/1993 | Bang et al. | 437/3 |
| 5,286,976 | * 2/1994 | Cole | 250/349 |
| 5,300,915 | * 4/1994 | Higashi et al. | 338/22 |
| 5,302,933 | * 4/1994 | Kudo et al. | 338/18 |
| 5,426,412 | * 6/1995 | Tomonari et al. | 338/18 |
| 5,584,117 | * 12/1996 | Lee et al. | 29/620 |
| 5,760,398 | * 6/1998 | Blackwell et al. | 250/332 |
| 5,789,753 | 8/1998 | Gooch et al. . | |
| 5,900,799 | * 5/1999 | Morris | 338/18 |
| 5,939,971 | * 8/1999 | Yong | 338/15 |
| 6,043,136 | * 3/2000 | Jang et al. | 438/424 |

FOREIGN PATENT DOCUMENTS

| | | | |
|---|---|---|---|
| 63-103924 | * 5/1988 | (JP) | 250/338.4 |
| 3-115583 | 5/1991 | (JP) . | |
| 10-122950 | 5/1998 | (JP) . | |

OTHER PUBLICATIONS

International Search Report Apr. 14, 1999, EPO.

* cited by examiner

*Primary Examiner*—Constantine Hannaher
(74) *Attorney, Agent, or Firm*—Pennie & Edmonds LLP

(57) ABSTRACT

A infra-red bolometer includes an active matrix level, a support level, a pair of posts and an absorption level. The active matrix level includes a substrate having a pair of connecting terminals. The support level includes a pair of bridges, each of the bridges being provided with a conduction line formed on top thereof, wherein one end of the conduction line is electrically connected to the respective connecting terminal. The absorption level includes a serpentine bolometer element surrounded by an absorber and a serpentine stress balancing member formed at bottom of the absorber. The serpentine stress balancing member has an identical shape, a same material and rotated 90° with respect to the serpentine bolometer element to make the compressive stress in the absorber evenly distributed, preventing the absorber from being bent to thereby allow the bolometer to ensure an optimum absorption efficiency.

9 Claims, 4 Drawing Sheets

BOLOMETER WITH A SERPENTINE STRESS BALANCING MEMBER

FIELD OF THE INVENTION

The present invention relates to an infra-red bolometer; and, more particularly, to the infra-red bolometer incorporating therein a serpentine stress balancing member.

BACKGROUND OF THE INVENTION

Bolometers are energy detectors based upon a change in the resistance of materials (called bolometer elements) that are exposed to a radiation flux. The bolometer elements have been made from both metals and semiconductors. In case of the metals, the resistance change is essentially due to a variation in the carrier mobility, which typically decreases with temperature. In contrast, greater sensitivity can be obtained in high-resistivity semiconductor bolometer elements wherein the free-carrier density is an exponential function of temperature; however, thin film fabrication of semiconductor elements for the construction of bolometers is a difficult task.

In FIGS. 1 and 2, there are shown a perspective view and a cross sectional view illustrating a bolometer 100, the bolometer 100 including an active matrix level 110, a support level 120, at least a pair of posts 170 and an absorption level 130.

The active matrix level 110 has a substrate 112 including an integrated circuit (not shown), a pair of connecting terminals 114 and a protective layer 116. Each of the connecting terminals 114 made of a metal is located on top of the substrate 112. The protective layer 116 made of, e.g., silicon nitride ($SiN_x$), covers the substrate 112. The pair of connecting terminals 114 are electrically connected to the integrated circuit.

The support level 120 includes a pair of bridges 140 made of insulating material, e.g., silicon oxide, each of the bridges 140 having a conduction line 165 formed on top thereof. One end of the conduction line 165 is electrically connected to the respective connecting terminal 114 through a via hole 155.

The absorption level 130 is provided with a bolometer element 185 made of titanium (Ti), an absorber 195 made of insulating material, e.g., silicon oxide ($SiO_2$) or silicon oxy-nitride ($SiO_xN_y$) and an IR absorber coating 197 formed on top of the absorber 195. The bolometer element 185 has a serpentine shape for increasing its resistivity.

Each of the posts 170 is placed between the absorption level 130 and the support level 120. Each of the posts 170 includes an electrical conduit 172 made of a metal, e.g., titanium (Ti), and surrounded by an insulating material 174 made of, e.g., silicon oxide ($SiO_2$) or silicon oxy-nitride ($SiO_xN_y$). Top end of the electrical conduit 172 is electrically connected to one end of the serpentine bolometer element 185 and bottom end of the electrical conduit 172 is electrically connected to the conduction line 165 on the bridge 140, in such a way that both ends of the serpentine bolometer element 185 in the absorption level 130 is electrically connected to the integrated circuit of the active matrix level 110 through the electrical conduits 172, the conduction lines 165 and the connecting terminals 114. When exposed to infra-red radiation, the resistivity of the serpentine bolometer element 185 changes, causing a current and a voltage to vary, accordingly. The varied current or voltage is amplified by the integrated circuit, in such a way that the amplified current or voltage is read out by a detective circuit (not shown).

There are certain shortcomings associated with the above described the infra-red bolometer 100. For example, since the absorption level 130 is structurally asymmetric, that is, the length of bolometer element 185 formed in row direction is different from that of bolometer element 185 formed in column direction, compression stress built up inside the absorber 195 gets unevenly distributed, bending the absorber 195 in one direction, as shown in FIG. 3, which will, in turn, reduce the overall absorption efficiency of the infra-red bolometer 100 decreases.

SUMMARY OF THE INVENTION

It is, therefore, a primary object of the present invention to provide an infra-red bolometer including a serpentine stress balancing member to counter the effect of the unevenly distributed compressive stress inside an absorber.

In accordance with one aspect of the present invention, there is provided an infra-red bolometer, which comprises: an active matrix level including a substrate and at least a pair of connecting terminals; a support level provided with at least a pair of bridges, each of the bridges including an conduction line, one end of the conduction line being electrically connected to the respective connecting terminal; an absorption level including a stress balancing member, an absorber and a bolometer element; and at least a pair of posts, each of the posts being placed between the absorption level and the support level and including an electrical conduit surrounded by an insulating material, each end of the bolometer element of the absorption level being electrically connected to the respective connecting terminal through the respective electrical conduit and the respective conduction line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
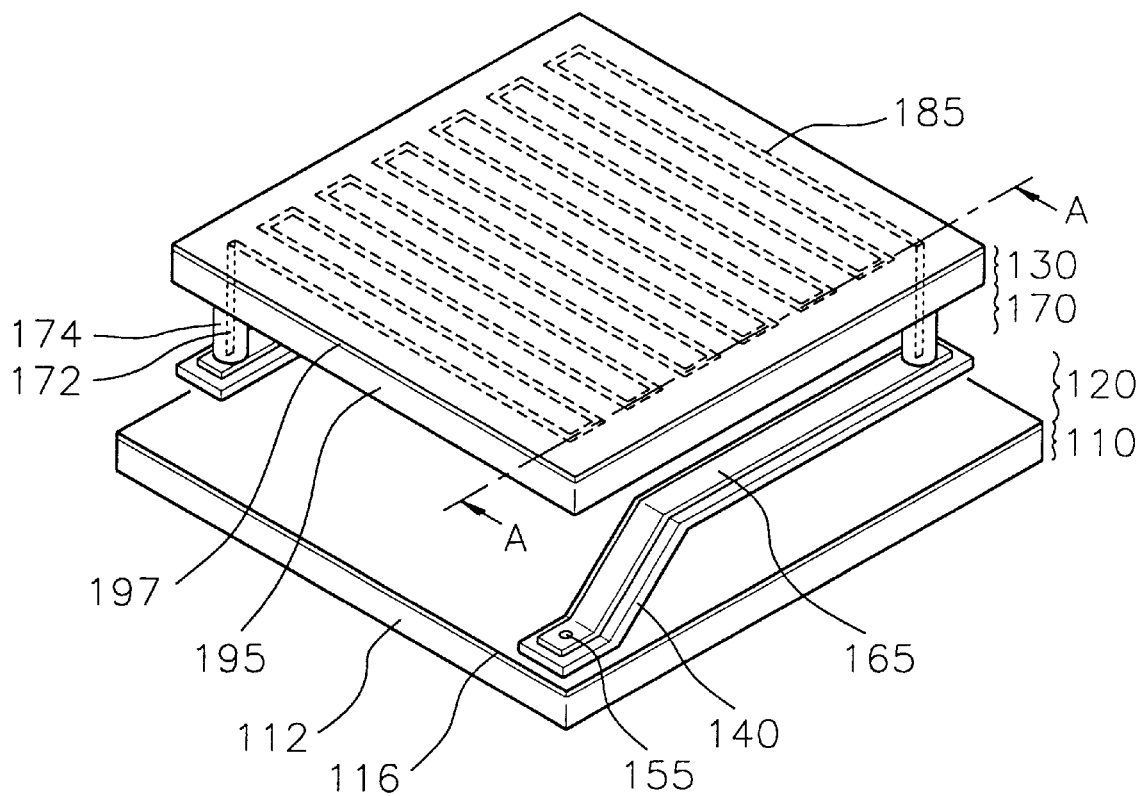
FIG. 1 shows a perspective view setting forth an infra-red bolometer previous disclosed.
Figure 2:
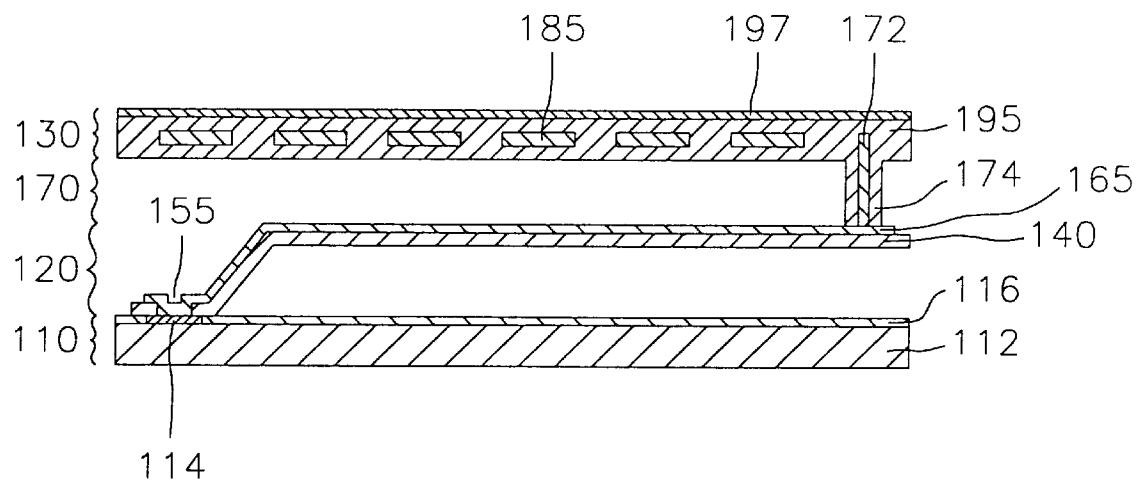
FIG. 2 presents a schematic cross sectional view illustrating of the infra-red bolometer taken along A—A shown in FIG. 1.
Figure 3:
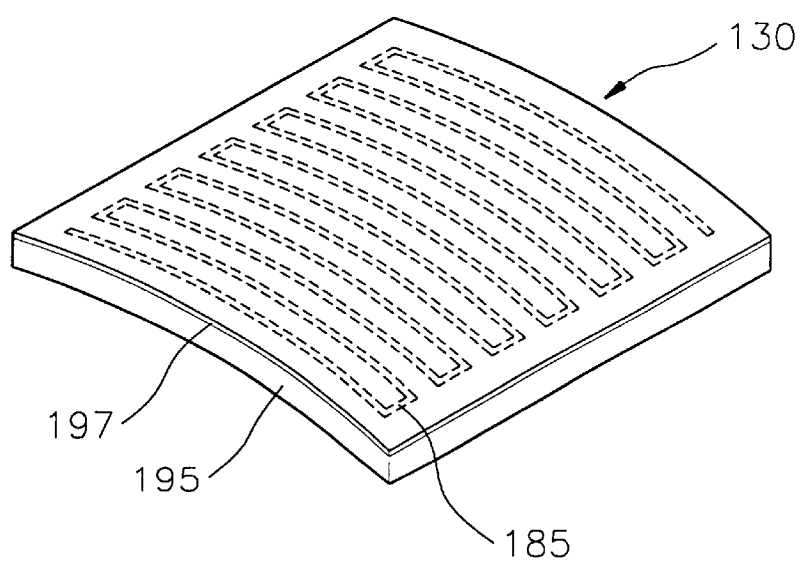
FIG. 3 depicts a perspective view describing an absorption level of the infra-red bolometer shown in FIG. 1.

There are provided in FIGS. 4 and 6, and 5 and 7 schematic cross sectional views setting forth a infra-red bolometers 200 and top plan views of an absorption level 230 thereof in accordance with two embodiments of the present invention, respectively. It should be noted that like parts appearing in FIGS. 4, 5, 6 and 7 are represented by like reference numerals.

Figure 4:
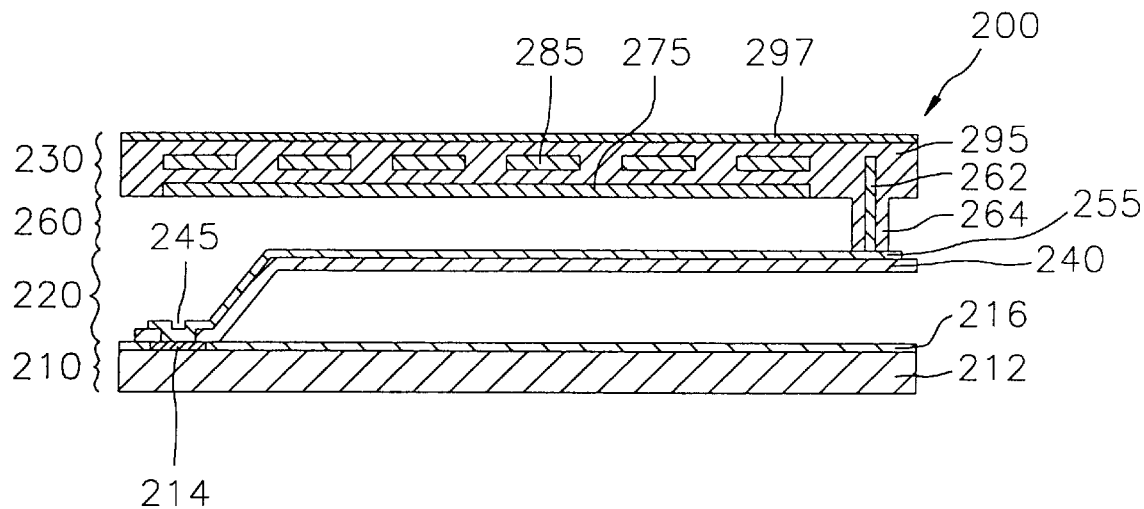
FIG. 4 provides a schematic cross sectional view setting forth an infra-red bolometer in accordance with one embodiment of the present invention.

In accordance with the first embodiment of present invention, the inventive bolometer 200 shown in FIG. 4 comprises an active matrix level 210, a support level 220, at least a pair of posts 260 and an absorption level 230.

The active matrix level 210 has a substrate 212 including an integrated circuit (not shown), at least a pair of connecting terminals 214 and a protective layer 216. The connecting terminals 214 made of a metal are located on top of the substrate 212 and are electrically connected to the integrated circuit of the substrate 212. The protective layer 216 made of, e.g., silicon nitride ($SiN_x$) covers the substrate 212.

The support level 220 includes at least a pair of bridges 240 made of an insulating material, e.g., silicon oxide ($SiO_2$) or silicon oxy-nitride ($SiO_xN_y$), and at least a pair of conduction line 255 made of a metal, e.g., titanium (Ti). Each of the conduction lines 255 is positioned on top of the respective bridge 240, one end of the conduction line 255 being electrically connected to the respective connecting terminal 214 through a via hole 245.

The absorption level 230 is provided with a serpentine bolometer element 285 surrounded by an absorber 295, a serpentine stress balancing member 275 located at bottom of the absorber 295, and an IR absorber coating 297 positioned on top of the absorber 295. The absorber 295 is made of insulating material, e.g., silicon oxide ($SiO_2$) or silicon oxy-nitride ($SiO_xN_y$). The serpentine bolometer element 285 is made of a metal, e.g., titanium (Ti).

Figure 5:
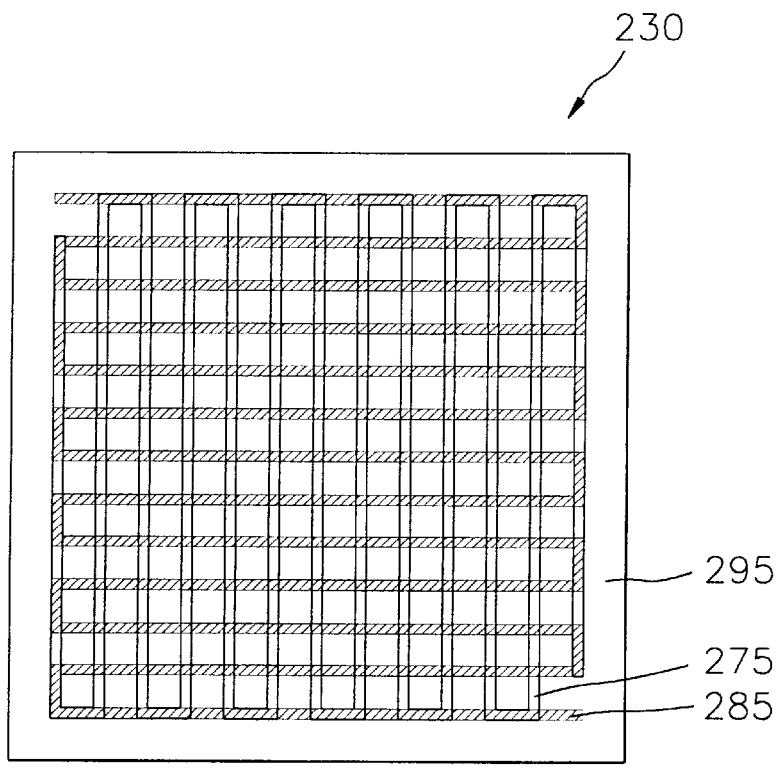
FIG. 5 depicts a top plan view describing an absorption level of the infra-red bolometer shown in FIG. 4.

FIG. 5 is a top plan view of the absorption level 230. The drawing is made as though the overlying IR absorber coating 297 and the overlying absorber 295 are transparent so the serpentine stress balancing member 275 and the serpentine bolometer element 285 can be shown. The serpentine stress balancing member 275 and the serpentine bolometer element 285 are identical in shape and made of a same material. When viewed from the top, the serpentine bolometer element 285 is placed on top of and rotated 90° with respect to the serpentine stress balancing member 275.

Returning to FIG. 4, each of the posts 260 is placed between the absorption level 230 and the support level 220. Each of the post 260 includes an electrical conduit 262 made of a metal, e.g., titanium (Ti) and surrounded by an insulating material 264 made of, e.g., silicon oxide ($SiO_2$) or silicon oxy-nitride ($SiO_xN_y$). Top end of the electrical conduit 262 is electrically connected to one end of the serpentine bolometer element 285 and bottom end of the electrical conduit 262 is electrically connected to the conduction line 255 on the respective bridge 240, in such a way that both ends of the serpentine bolometer element 285 in the absorption level 230 are electrically connected to the integrated circuit of the active matrix level 210 through the electrical conduits 262, the conduction lines 255 and the connecting terminals 214. When the infra-red energy is absorbed, the resistivity of the serpentine bolometer element 285 is increased, in such a way that the increased resistivity is read out by a detective circuit (not shown).

Figure 6:
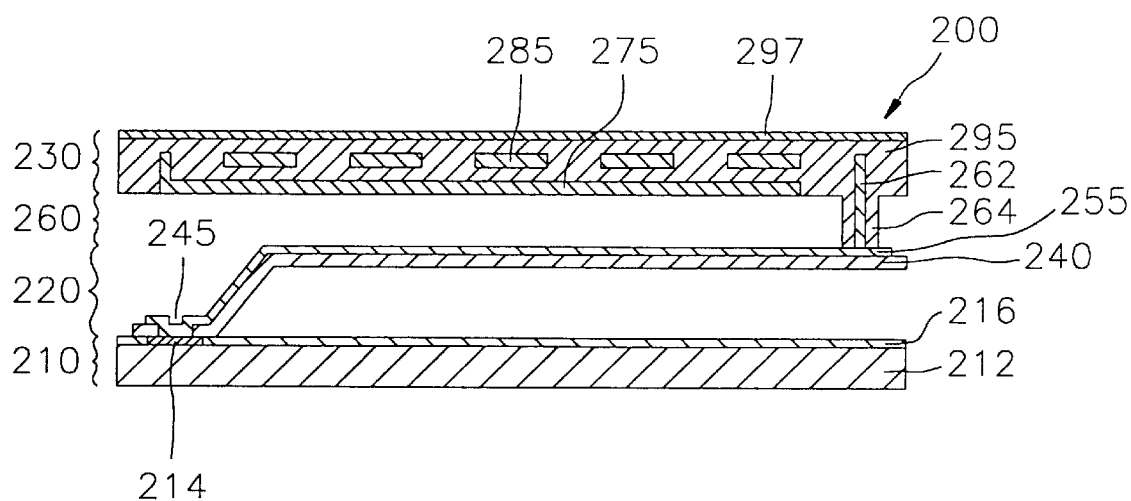
FIG. 6 provides a schematic cross sectional view of an infra-red bolometer in accordance with another embodiment of present invention.
Figure 7:
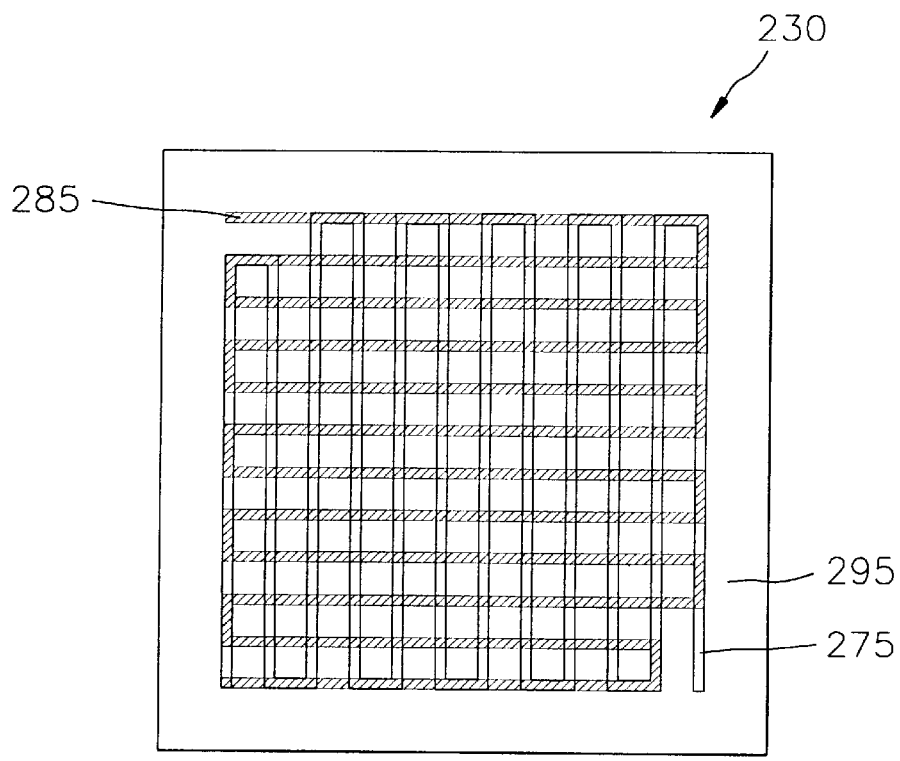
FIG. 7 depicts a top plan view describing an absorption level of the infra-red bolometer shown in FIG. 6.

FIGS. 6 and 7 show another preferred embodiment of the invention which has several significant differences from the first embodiment described above. One electrical conduit 262 of pair is electrically connected to one end of the serpentine bolometer element 285 and the other electrical conduit 262 of pair is electrically connected to one end of the serpentine stress balancing member 275. The other ends of the serpentine bolometer element 285 and the serpentine stress balancing member 275 are electrically connected to each other. Accordingly, the serpentine bolometer element 285 is electrically connected to the serpentine stress balancing member 275 in series in such a way that the serpentine stress balancing member 275 also functions as bolometer element, thereby increasing the its resistivity.

In the infra-red bolometer 200 of the present invention, there is formed at bottom of the absorber 295 the serpentine stress balancing member 275 having an identical shape, made of a same material and rotated 90° with respect to the serpentine bolometer element 285 to make the compressive stress in the absorber 295 evenly distributed, preventing the absorber 230 from being bent to thereby allow the bolometer to ensure an optimum absorption efficiency.

While the present invention has been described with respect to certain preferred embodiments only, other modifications and variations may be made without departing from the scope of the present invention as set forth in the following claims.

What is claimed is:

1. A bolometer comprising:

an active matrix level including a substrate and at least a pair of connecting terminals;

a support level provided with at least a pair of bridges, each of the bridges including a conduction line, one end of the conduction line being electrically connected to the respective terminal;

an absorption level including a stress balancing member formed at the bottom of an absorber and a bolometer element surrounded by the absorber, wherein the stress balancing member has a same shape as the bolometer element and is rotated 90° with respect thereto; and at least a pair of posts being placed between the absorption level and the support level, each of the posts including an electrical conduit surrounded by an insulating material, wherein top end of the electrical conduit is electrically connected to the other end of the respective conduction line.

2. The bolometer of claim 1, wherein the bolometer element and the stress balancing member have a serpentine shape.

3. The bolometer of claim 1, wherein the bolometer element and the stress balancing member are made of a same material.

4. The bolometer of claim 3, wherein the material is titanium (Ti).

5. The bolometer of claim 1, wherein the bolometer element has first and second ends, and each end of the bolometer element of the absorption level is electrically connected to the respective connecting terminal through the respective electrical conduit and the respective conduction line.

6. The bolometer of claim 1, wherein the bolometer element has first and second ends and the stress balancing member has first and second ends;

a first end of each of the bolometer element and the stress balancing member is electrically connected to the respective electrical conduit; and the second ends of the bolometer element and the stress balancing member are electrically connected to each other.

7. The bolometer of claim 1, wherein the active matrix level further includes a protective layer covering the substrate.

8. The bolometer of claim 1, wherein the absorption level further includes an IR absorber coating formed on top of the absorber.

9. In a bolometer having an active matrix level, a support level and an absorption level including a bolometer element surrounded by an absorber, the improvement comprising:

a stress balancing member at the bottom of the absorber, wherein the stress balancing member has a same shape as the bolometer element and is rotated 90° with respect thereto.

* * * * *